United States Patent [19]

Shirouzu et al.

[11] Patent Number: 4,829,916
[45] Date of Patent: May 16, 1989

[54] TRANSPLANTING MACHINE

[76] Inventors: Atsushi Shirouzu, 4-9, Heiwadori 1-chome Minami, Shiroishi-ku, Sapporo-shi, Hokkaido; Araji Takaki, 456-4, Teinemiyanosawa, Nishi-ku, Sapporo-shi, Hokkaido, both of Japan

[21] Appl. No.: 97,131

[22] Filed: Sep. 16, 1987

[30] Foreign Application Priority Data

Sep. 19, 1986 [JP] Japan .............................. 61-221071

[51] Int. Cl.$^4$ ............................................. A01C 11/02
[52] U.S. Cl. ................................................... 111/105
[58] Field of Search ........................... 111/2, 3; 47/9

[56] References Cited

U.S. PATENT DOCUMENTS 3,923,332 12/1975 Shirouzu .................................. 111/2
4,106,669 8/1978 Longman ................................. 111/2
4,597,343 7/1986 Nambu .................................... 111/3

Primary Examiner—Brian S. Steinberger
Attorney, Agent, or Firm—James E. Nilles; Donald C. McGaughey

[57] ABSTRACT

A transplanting machine wherein a potted seedling to be transplanted is separated from a seedling pot arrangement having transverse rows staggered by a seedling separator, while holding by a seedling regulator from the front at least the potted seedling which are positioned at both sides of the potted seedling being separated. The seedling separator includes regulating plates fixed on a spindle, arm members carried in a rocking manner on the regulating plates, separating needles projecting from the arm members for penetrating into and coming out from the potted seedlings as the regulating plates rotate, springs for biasing the arm members in the projecting directions of the separating needles, and cams for moving the separating needles penetrating in the potted seedlings generally at a right angle with respect to and apart from the joint plane of the potted seedlings, as cam receiving portions formed in the arm members slide in accordance with the rotations of the regulating plates on the cam.

2 Claims, 5 Drawing Sheets

TRANSPLANTING MACHINE

BACKGROUND OF THE INVENTION

1. Field of the Invention

The present invention relates to a transplanting machine using a seedling pot arrangement in which the seedlings of crops are raised for transplantations in a raising container having separatably adhered paper pots.

2. Description of the Prior Art

There are a variety of transplantations, of which the transplantation using paper-potted seedlings are accepted as promising. In this method using the paper pots, a raising container having a number of paper pots arranged regularly and adhered separatably is used. This container is packed with soil and sowed with seeds for raising the seedlings. Individual potted seedlings are separated for transplantations from the pot arrangement. This technique is expected for a variety of crops partly because the transplantations can hold the soil without fail and partly because the paper pots being developed will decompose for a short time period after the transplantations.

On the other hand, the transplanting machine desired for the potted seedlings is of the natural drop type because of its high speed. In the prior art, more specifically, it has been confirmed that the yield is not seriously influenced by more or less fluctuations in the root intervals and disturbances of the planted positions. Since a drastically high yield is expectable from the transplantations using the potted seedlings, the accuracies in the root intervals and the planted positions having been required for the transplanting machine of the prior art can now be secondary to adopt the natural drop plantations. If the potted seedlings are used, on the other hand, the packing soil is far heavier than the stems and blades of the seedlings so that the potted seedlings are feasible to drop an to be positioned. Moreover, the potted seedlings can be easily separated from the pot arrangement so that they are suitable for the high-speed separations.

Incidentally, in the transplanting machine for separating and dropping one potted seedling from the pot arrangement, when a certain potted seedling is to be separated, the others adjoining that seedling may possibly be separated to drop together. Accordingly, there has been adopted a structure for feeding the seedling pot arrangement to the separator while pushing its front face to a regulator. According to this structure, both the potted seedlings positioned at both sides of the seedling being separated will not be separated. In case, however, the seedling pot arrangement has no displacement in the longitudinal and transverse directions, the potted seedlings adjacent to the rear side of the seedling being separated may possibly be separated together.

SUMMARY OF THE INVENTION

An object of the present invention is to solve the problems specified above and to provide a transplanting machine of high performance which can drastically widen the transplantations.

The above-specified object of the present invention can be achieved by a transplanting machine for separating individual potted seedlings to be transplanted from a seedling pot arrangement which has its seedlings raised in a container composed of separatably adhered paper pots, comprising: a seedling feeder for sequentially feeding said seedling pot arrangement; and a seedling separator for separating in a predetermined position the potted seedlings at the leading end of said seedling pot arrangement, wherein said seedling pot arrangement has at least its transverse rows staggered; and a seedling regulator for holding from the front at least the potted seedlings which are positioned at both sides of the potted seedling being separated is provided.

According to the transplanting machine of the present invention, the seedling pot arrangement is sequentially fed out by the seedling feeder such that the potted seedlings at the leading end of the arrangement are separated in the predetermined position by the seedling separator. At this time, at least the potted seedlings at both sides of the seedling being separated are held from the front by the seedling regulator to prevent the separation of the potted seedlings at both sides. At the same time, at least the transverse rows in the seedling pot arrangement are alternately staggered so that the potted seedlings at the rear side of the seedling being separated are held from the front by the potted seedlings at both sides, thus preventing the seedling at the rear side from being separated. Thus, the potted seedlings other than the seedling to be separated are prevented from being separated from the seedling pot arrangement.

BRIEF DESCRIPTION OF THE DRAWINGS

Other objects and features of the present invention will be described in detail in the following with reference to the accompanying drawings, in which.

DESCRIPTION OF THE PREFERRED EMBODIMENT

Figure 6:
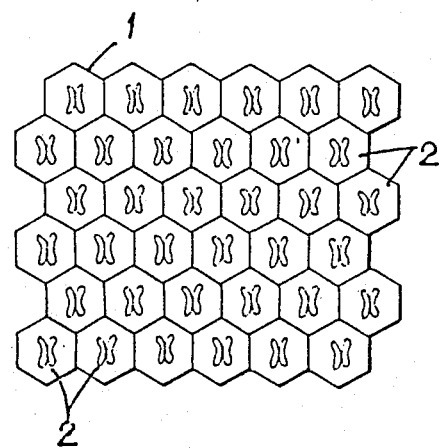
FIG. 6 is a top plan view showing a seedling pot arrangement.
Figure 7:
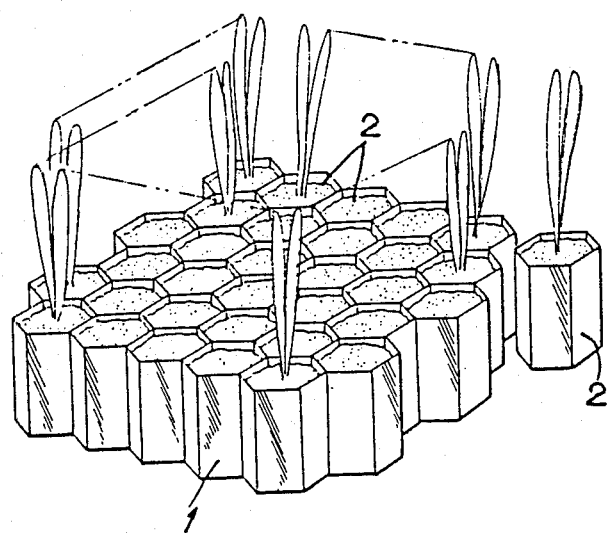
FIG. 7 is a perspective view of the seedling pot arrangement.

FIGS. 6 and 7 show a seedling pot arrangement 1 to be used in a transplanting machine according to the present invention. This seedling pot arrangement 1 is made of a seedling raising container which is composed of a number of hexagonal paper pots. These paper pots are regularly arranged in a honeycomb structure in the longitudinal and transverse directions and are separably adhered with water-soluble paste. These paper pots are packed with soil and seeded to raise seedlings so that they may be separated for transplantations into individual potted seedlings 2.

Next, the transplanting machine will be described in the following.

Figure 1:
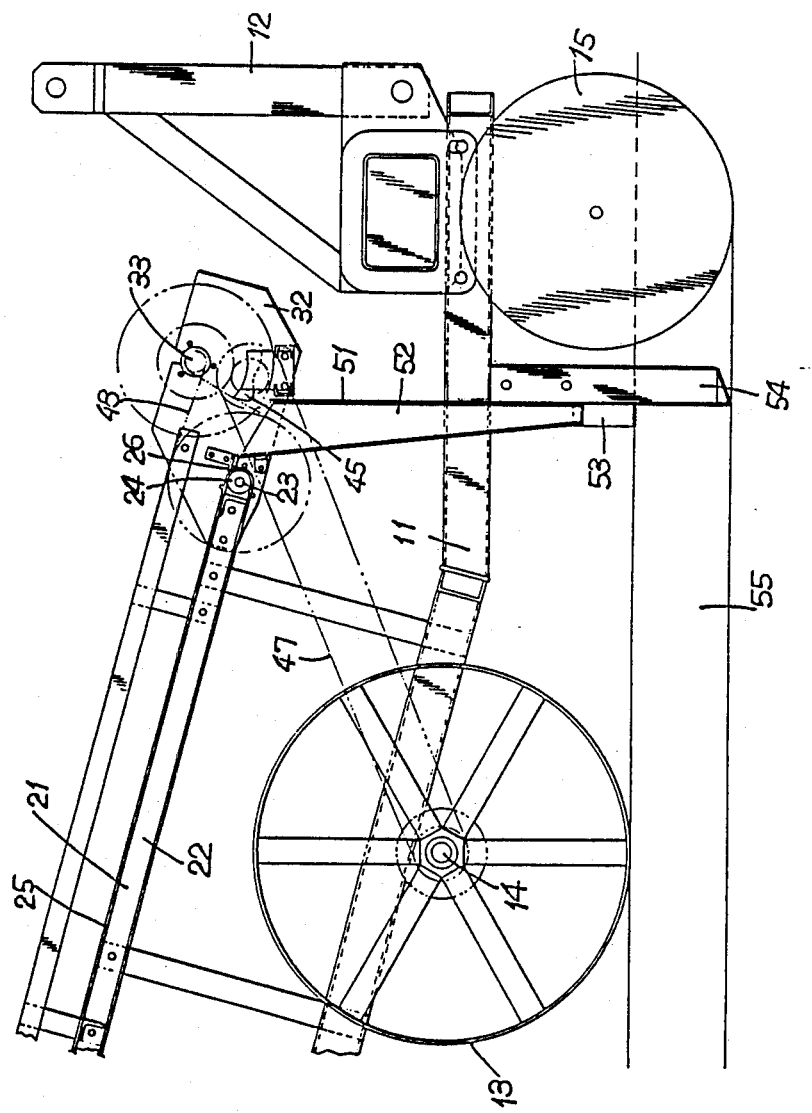
FIG. 1 is a side elevation showing one embodiment of the transplanting machine of the present invention with its portion being cut away.

Turning now to FIG. 1, reference numeral 11 denotes a frame which is equipped with a tractor hitch 12 at its front upper portion and with a pressing wheel 13 at its rear portion. This pressing wheel 13 is borne by an axle 14. A colter 15 is borne by a front lower portion of the frame 11.

This frame 11 is further equipped at its upper portion with a seedling conveyor 21 which is sloped downhill to the front so that it may act as a seedling feeder. In this seedling conveyor 21, roller pulleys 24 are borne in front and rear portions of a conveyor frame 22 by shafts 23, and an endless conveyor belt 25 is made to run between the front and rear roller pulleys 24. A receiving plate 26 is arranged at a portion near the front portion of the seedling conveyor 21.

The receiving plate 26 carries a seedling regulator 31 at its front portion. In this seedling regulator 31, as better seen from FIGS. 2 and 4, a spindle 33 is transversely borne by frame plates 32 which are fixed in the front portion of the conveyor frame 22, and a number of generally semicircular regulating plates 34 are fixed at the centers of their arcuate portions 34a on that spindle 33 such that they are spaced at a predetermined interval. Each of these regulating plates 34 has its arcuate portion 34a, which constitutes a means for abutting the potted seedling containers from the front thereof as will be more fully explained hereinafter, formed to have a spiral periphery. Moreover, the individual regulating plates 34 are arranged with a phase deference of $360°/2m$ first in the order of odd numbers, i.e., $A_1$, $A_3$, ..., and $A_{2m-1}$ and then in the order of even numbers, i.e., $A_2$, $A_4$, ..., and $A_{2m}$, if their total number is designated at $2m$ and if they are numbered with $A_1$, $A_2$, ..., $A_{2m-1}$ and $A_{2m}$ from their one end. Incidentally, the seedling conveyor 21 and the seedling regulator 31 are made to merge into each other at a small angle with respect to a horizontal plane, as better seen from FIG. 4.

On the other hand, a seedling separator 36 is provided for each of the regulating plates 34. In this seedling separator 36, an arm member 37 is borne in a rocking manner by a pin 38 at an end portion of the minimum-diameter portion of the arcuate portion 34a of each regulating plate 34. From the leading end of the arm member 37, there extends a separating needle 39 which is formed into an arcuate shape in the direction of rotation of the regulating plate 34. In the leg portion of the arm member 37, there is projected a stopper pin 40 which is slidably engaged with an arcuate groove 41 formed in the regulating plate around the pin 38. Between the stopper pin 40 and a pin 42 fixed on the regulating plate 34, on the other hand, there is tensed a spring 43 for biasing the arm member 37 generally in the same direction as the rotating direction of the regulating plate 34. A cam bearing pin 44 is fixed at the leg end of the arm member 37.

To the frame plate 32, on the other hand, there is fixed through a cam support 46 a cam member 45 on which the cam bearing pin 44 slides. The cam member 45 has its cam surface formed generally into an S shape which is composed of: a linear portion 45a extending generally in a radial direction of the regulating plate 34; a relatively small, arcuate bulge portion 45b extending from the linear portion 45a; and a gentle recess portion 45c extending from the bulge portion 45b in the circumferential direction of the regulating plate 34.

The axle 14 of the holding wheel 13 and the spindle 33 of the seedling regulator 31, and the seedling conveyor 21 and the spindle 33 are connected through associating mechanisms 47 and 48, respectively, as shown in FIG. 1. When the pressing wheel 13 rotates, the individual regulating plates 34 are rotated with the spindle 33 through the associating mechanism 47, and the conveyor belt 25 of the seedling conveyor 21 is rotated through the associating mechanism 48.

As seen from FIG. 1, a seedling guide 51 is disposed in a front lower portion of the seedling conveyor 21. In this seedling guide 51, a chute 52 is attached in an upright position to the machine frame 11. From this chute 52, there extends a guide member 53 having a generally C-shaped section, which is opened at its rear from the lower end of that chute 52. In front of the guide member 53, there is fixed a groove opener 54 which is positioned at the back of the aforementioned colter 15.

The operations of the transplanting machine thus constructed will be described in the following. When the machine is moved by connecting a tractor to the hitch 12 of the machine frame 11 through a three-point link mechanism, the colter 15 forms in the field a narrow groove acting as a guide at one side, through which the groove opener 54 runs to form a planting groove 55.

Simultaneously with this, the pressing wheel 13 turns forward so that its rotations are transmitted to the spindle 33 of the seedling regulator 31 to rotate the individual regulating plates 34 and to run the conveyor belt 25 of the seedling conveyor 21.

As a result, the seedling pot arrangement 1 carried on the seedling conveyor 21 is conveyed forward at a constant speed. As seen from FIG. 2, the potted seedlings 2 are sequentially peeled an separated from the seedling pot arrangement 1 first in the order of $B_2$, $B_4$, and $B_{2m}$ and then in the order of $B_1$, $B_3$, ..., and $B_{2m-1}$ until they drop into the chute 52, while the spindle 33 of the regulating plates 34 is making one rotation, if the potted seedlings 2 in the foremost row (i.e., the most righthand row, as shown) are evenly numbered from one side to other side with $B_2$, $B_4$, ..., and $B_{2m}$ and if the potted seedlings 2 in a second row, which are located in alternate positions with respect to those in the foremost row and spaced backward by their radius are oddly numbered from one side to other side with $B_1$, $B_3$, ..., and $B_{2m-1}$.

These operations will be described in more detail in the following.

Figure 5:
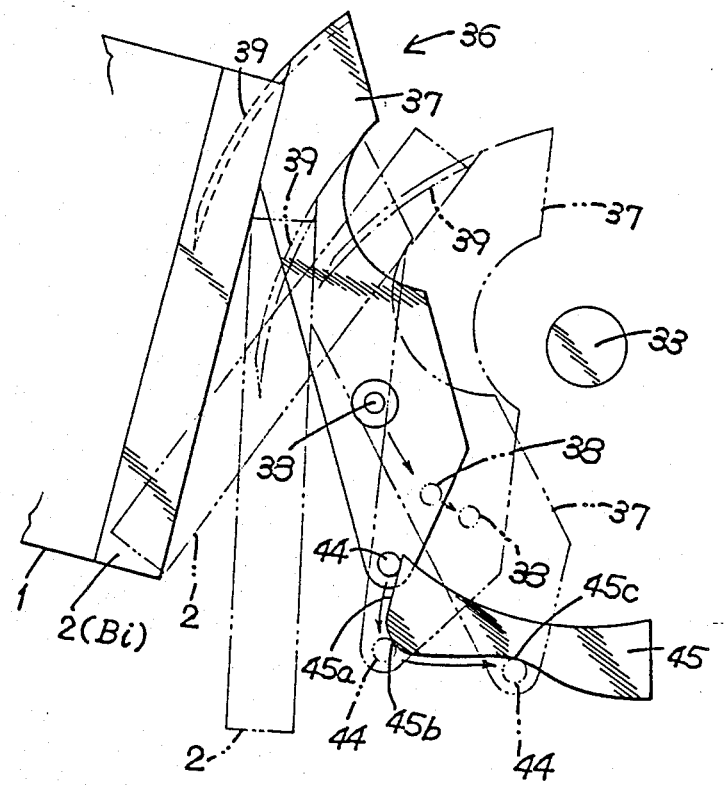
FIG. 5 is a diagram for explaining the operations of the seedling separator.
Figure 4:
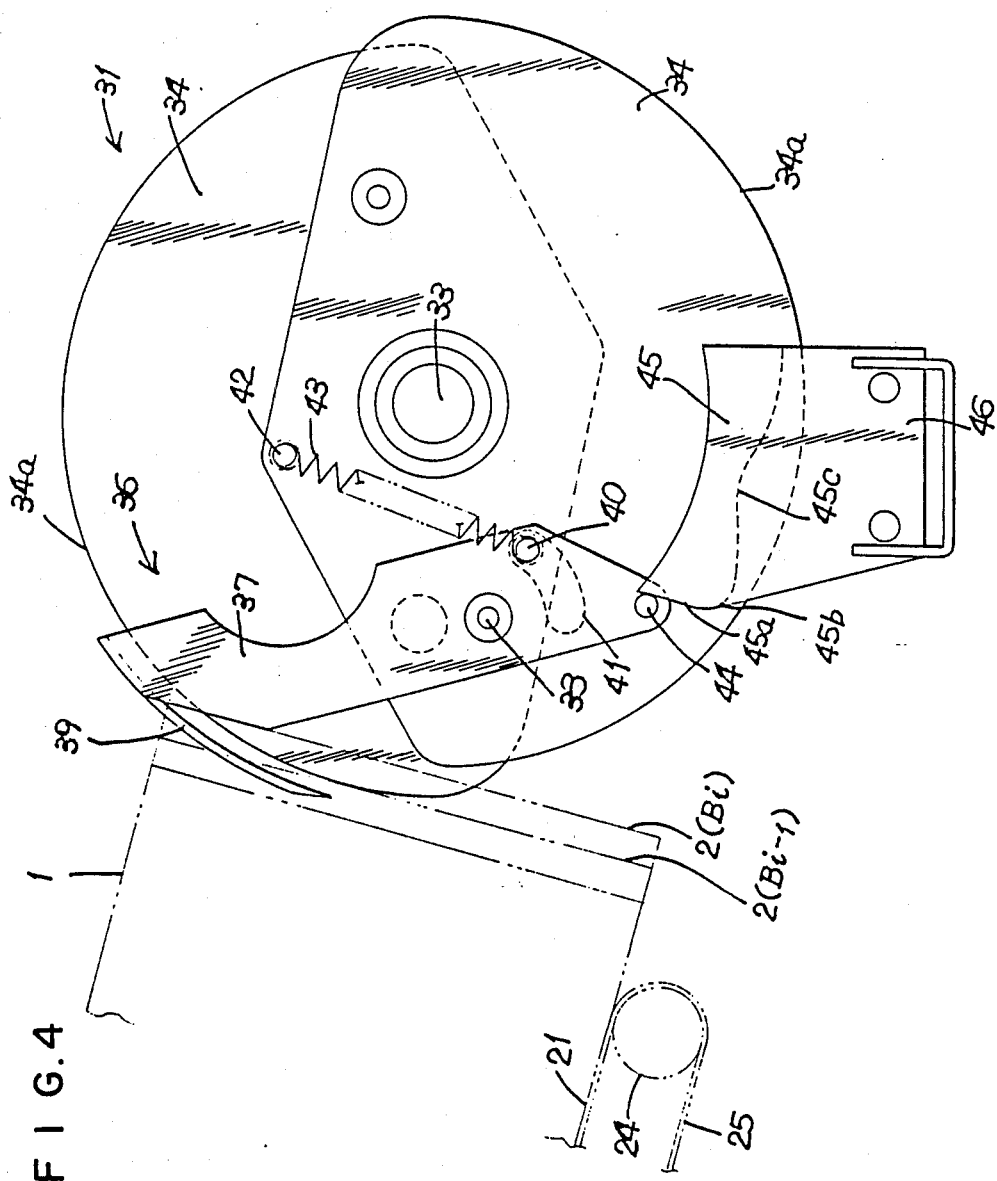
FIG. 4 is a side elevation showing a seedling separator of the transplanting machine.

If the potted seedling 2 (which will be generally denoted at $B_i$) comes to a predetermined position of the spindle 33, the separating needle 39 of the regulating plate 34 corresponding to that potted seedling $B_i$ penetrates downward into the holding soil in the seedling $B_i$, as seen from FIGS. 4 and 5. At this time, the arm member 37 carrying the separating needle 39 is able to freely rock with respect to the regulating plate 34 but is biased in its projecting direction by the spring 43 so that its penetration is never failed. At this instant, the cam bearing pin 44 of the arm member 37 carrying the separating needle 39 abuts against the linear portion 45a of the cam member 45. Since, however, this linear portion 45a extends generally in the radial direction of the regulating plate 34, the arm member 37 rocks clockwise, as shown, against the biasing force of the spring 43 as the regulating plate 34 rotates counter-clockwise. And, this motion of the arm member 37 is directed forward so that the corresponding potted seedling $B_i$ is peeled from the adjoining one without fail, as indicated by dotted lines in FIG. 5. In other words, a force directed generally at a right angle with respect to the adhering plane between the seedling $B_i$ and the adjoining seedling 2 is applied to the seedling $B_i$ by the aforementioned motions of the arm member 37 so that the seedling $B_i$ can be smoothly peeled off without any damage.

If the regulating plate 34 continues its rotation so that the cam bearing pin 44 rides over the bulge portion 45b of the cam member 45 and reaches the recess portion 45c, the arm member 37 abruptly turns counter-clockwise so that the separating needle 39 and the potted seedling $B_i$ are directed downward. Then, the separating needle 39 comes out of the holding soil in the potted seedling B so that this seedling $B_i$ is freed to drop into the chute 52.

Figure 2:
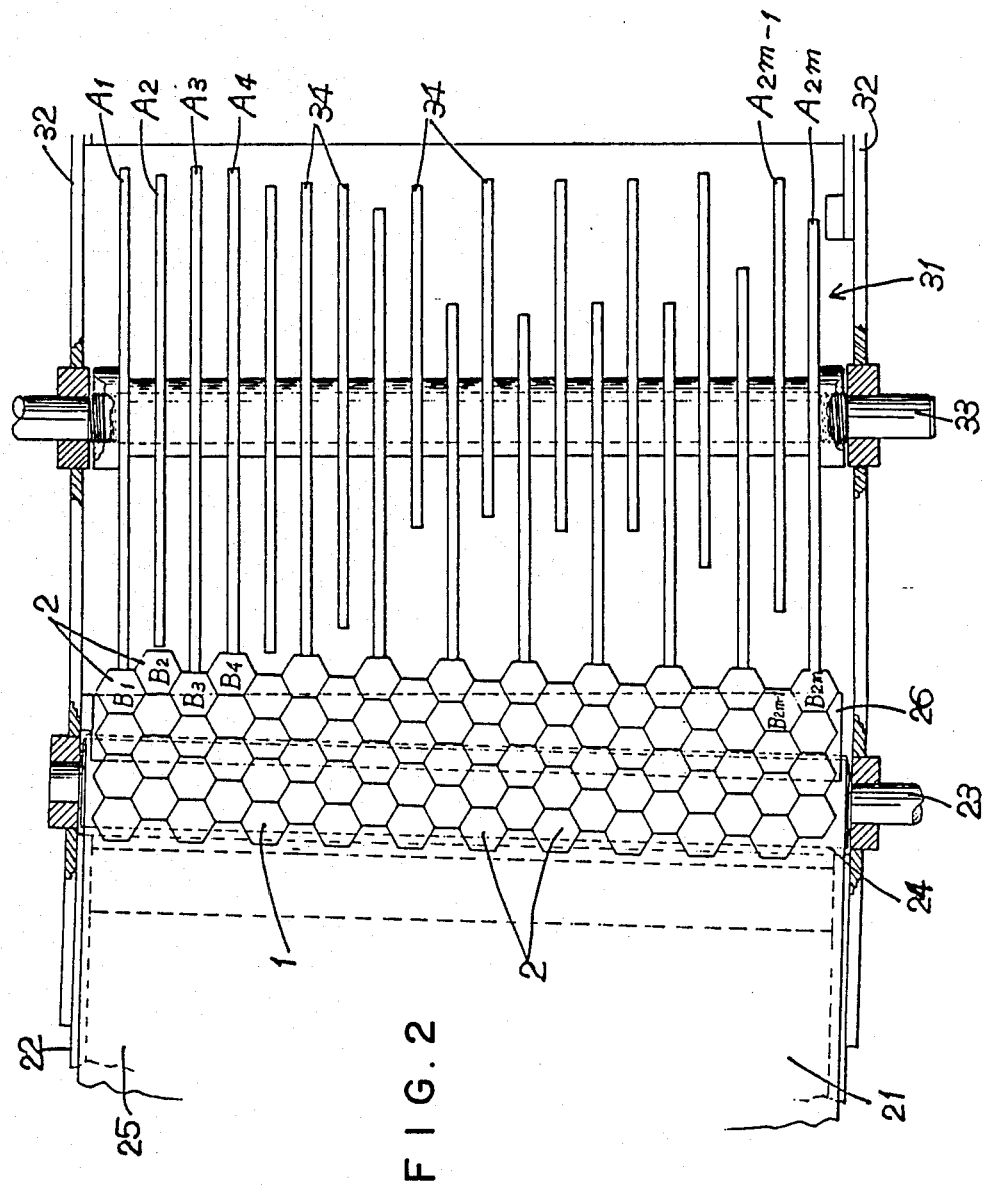
FIG. 2 is a partially cut-away top plan view showing a seedling regulator of the transplanting machine.
Figure 3:
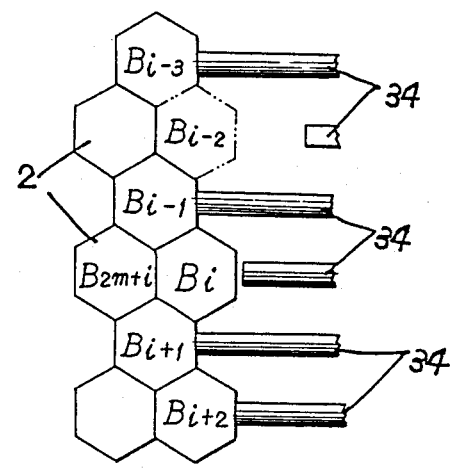
FIG. 3 is an enlarged view showing a portion of FIG. 2.

When the separating needle 39 penetrates into the potted seedling $B_i$ to be separated, the maximum-diameter of the arcuate portion 34a of the regulating plate 34 abuts against the front face of the potted seedling $B_{i+1}$ which is adjacent to the lefthand rear side of the potted seedling $B_i$, as seen from FIGS. 2 and 3. This abutment is continued while the spindle 33 makes about one half rotation. In this meanwhile, the forward movement of the potted seedling $B_{i+1}$ is continued by the action of the seedling conveyor 21. Since, however, the arcuate portion 34a is formed into such a spiral curve that the radius at the abutment against the potted seedling $B_{i+1}$ becomes the smaller with the more advancement of the seedling $B_{i+1}$, the load to be applied to the potted seedling $B_{i+1}$ by the regulating plate 34 is always maintained at a constant level. At the instant when the potted seedling $B_i$ is pierced by the separating needle 39, the regulating plate 34 is in abutment against both each of the potted seedlings $B_{i+2}$, $B_{i+4}$, . . . , and so on, i.e., the unseparated potted seedlings 2 in the foremost row and the potted seedlings $B_{i+1}$, $B_{i-1}$, $B_{i-3}$, . . . , and so on, i.e., such potted seedlings 2 in the second row that their adjacent seedlings 2 in the foremost row have already been separated or are being separated. This means that both the potted seedlings $B_{i-1}$ and $B_{i+1}$ adjacent to the two sides of the seedling $B_i$ being separated are not peeled off. Since, moreover, the potted seedlings 2 are hexagonal and arranged in the honeycomb form, the peeling of one potted seedling $B_i$ will not cause the other seedlings 2 to be peeled together. For example, the potted seedling $B_{2m+1}$ adjacent to the rear side of the seedling $B_i$ being peeled is held backward by the seedlings $B_{i-1}$ and $B_{i+1}$ regulating by their regulating plates 34 so that it will not be peeled off together with the potted seedling $B_i$ to be separated.

Moreover, the potted seedling 2 drops into the chute 52 and is discharged through the guide member 53 to the planting groove 55.

Thus, the potted seedlings 2 are sequentially placed in the planting groove 55, and the pressing wheels 13 level the raised soil, while running along the planting groove 55, to cover and press the potted seedlings 2 placed in the groove 55 with the soil.

Incidentally, embodiment thus far described is constructed such that the regulating plates 34 are held in abutment against all the potted seedlings 2 in the foremost row. This is because the seedling pot arrangement 1 itself is held in position. In order to prevent the potted seedlings 2 other than the seedling 2 to be separated from being separated, it is sufficient to hold only two potted seedlings 2 at both sides of the seedling 2 to be separated.

In the construction of the embodiment, on the other hand, the potted seedlings 2 are separated one by one. Alternatively, a plurality of planting grooves 55 may be formed to separate a plurality of potted seedlings 2 at the same time.

Figure 8:
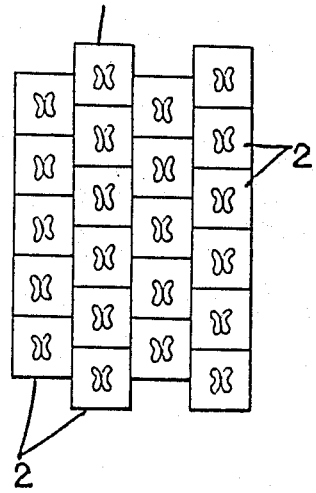
FIG. 8 is a top plan view showing another seedling pot arrangement.

In the embodiment, on the other hand, the hexagonal potted seedlings 2 are arrayed in the honeycomb shape to make the seedling pot arrangement 1. As shown in FIG. 8, however, this pot arrangement 1 may be constructed by arranging rectangular potted seedlings 2 in transverse rows and by alternately staggering those rows in the longitudinal direction. The seedling pot arrangement 1 may also be constructed by staggering cylindrical potted seedlings 2. In short, it is sufficient to alternately stagger the transverse rows in the seedling pot arrangement 1. In this pot arrangement 1, therefore, the potted seedlings 2 other than that to be separated can be prevented without fail from being separated together, merely by holding the potted seedlings 2 at both sides of the seedling 2 to be separated with the seedling regulator 31.

Moreover, the pressing wheel 13 may be exemplified by another prime mover.

On the other hand, the seedling feeder for sequentially feeding the potted seedlings 2 from the pot arrangement 1 should not be limited to the seedling conveyor 21.

In the embodiment, on the other hand, the potted seedling 2 is allowed to drop into the chute 52 leading to the planting groove 55 immediately after they are separated by the seedling separator 36. The transplanting machine may be constructed such that the potted seedlings 2 are transferred, after separated, in a row to a conveyor other than the seedling conveyor 21 and then fed to a planter so that they may be planted one by one.

According to the present invention, the seedling pot arrangement has its potted seedlings staggered alternately at least in transverse rows, and there is provided the seedling regulator for holding from the front at least the potted seedlings positioned at both sides of the potted seedling being separated. As a result, not only the potted seedlings at both sides but also the remaining seedlings at the back of the seedling being separated are not separated because the latter seedlings are held by the former seedlings. Thus, it is reliably possible to prevent separation of the potted seedlings other than that to be separated.

Moreover, even the crops having been directly planted in the prior art can be transplanted to drastically improve the agricultural management while sufficiently exhibiting the effect of transplantation of the crops.

What is claimed is:

1. A transplanting machine for separating individual paper pot seedling containers each having a seedling therein from a longitudinally extending seedling pot arrangement composed of a plurality of said containers separably adhered together and arranged in rows extending transversely of said longitudinal seedling arrangement with said transverse rows adhered together and arranged in succession along said longitudinal seedling arrangement, each of said individual containers having an interface with adjacent containers with the interface between individual containers in one row staggered in relation to the interfaces between individual containers of the transverse rows that are immediately adjacent said one row, comprising:

a mobile frame;

a seedling feeder mounted on said frame and having front portion and a means for moving said seedling pot arrangement to sequentiality present each of said transverse rows of containers at a foremost row position at said front portion after all of said container in a preceding row have been separated from each other and transplanted;

a seedling separator mounted on said frame for separating each of said individual containers in said foremost row for transplanting, and a seedling regulator mounted on said frame and having means for abutting and preventing separation of each of the individual containers that are on each side of each individual container which is currently being separated from said arrangement for transplanting and wherein said seedling regulator includes a spindle rotatably mounted on said frame, and a multiplicity of regulating plates fixed on said spindle at predetermined space apart intervals, each of said plates having a peripheral arcuate portion formed into a spiral curve with rotation of said spindly moving said arcuate portions of at least these plates that are on each side of the container being removed, into contact with the containers on each side of the container being removed.

2. A transplanting machine separating individual paper pot seedling containers each having a seedling therein from a longitudinally extending seedling pot arrangement composed of a plurality of said container separatably adhered together and arranged in rows extending transversely of said longitudinal seedling arrangement with said transverse rows adhered together and arranged in succession along said longitudinal seedling arrangement, each of said individual containers having an interface with adjacent containers with the interface between individual containers in one row staggered in relation to the interfaces between individual containers of the transverse rows that are immediately adjacent said one row, comprising:

a mobile frame;

a seedling feeder mounted on said frame and having a front portion and a means for moving said seedling pot arrangement to sequentially present each of said transverse rows of containers at a foremost row position at said front portion after all of said containers in a preceding row have been separated from each other and transplanted;

a seedling separator mounted on said frame for separating each of said individual containers in said foremost row for transplanting, and a seedling regulator mounted on said frame and having means for abutting and preventing separation of each of the individual containers that are on each side of each individual container which is currently being separated from said arrangement for transplanting; and wherein said seedling separator includes:

a spindle rotatably mounted on said frame;

a multliplicity of regulating plates fixed on said spindle at predetermined spaced apart intervals;

an arm member mounted on each of said regulating plates for rocking movement about an axis;

a separating needle mounted on each of said arm member and positioned to penetrate into and come out of said containers during rotation of said regulating plates;

a biasing means connected between each of said plates and the arm mounted thereon the bias the associated arm in a direction to project the needle thereon into position for penetration into a container;

a cam means mounted on said frame adjacent each of said regulating plates; and a cam follower mounted on each of said arms for contact with one of said cam means to move said associated arm and needle, when penetrated into one of said container in response to rotation of said plate, generally away from the interface of said one container with adjacent containers to remove said one container for transplanting.

* * * * *